United States Patent [19]

Santos et al.

[11] Patent Number: 5,017,866
[45] Date of Patent: May 21, 1991

[54] MAGNETIC FIELD SENSOR MOUNTING WITH SENSOR ARM CONTACTING ROTATING BEARING MEMBER

[75] Inventors: Alfred J. Santos, Canton Center; James A. Hilby, Watertown; Scott M. Duncan, Avon, all of Conn.

[73] Assignee: The Torrington Company, Torrington, Conn.

[21] Appl. No.: 476,924

[22] Filed: Feb. 8, 1990

[51] Int. Cl.5 .................. G01P 3/487; F16C 32/00
[52] U.S. Cl. .................. 324/174; 324/207.20; 384/448
[58] Field of Search .................. 324/173, 174, 207.14, 324/207.20–207.22, 207.25; 310/155, 268; 384/446, 448

[56] References Cited

U.S. PATENT DOCUMENTS

| | | | |
|---|---|---|---|
| 3,683,219 | 8/1972 | Kruse | 310/168 |
| 3,772,548 | 11/1923 | Wroblewski et al. | 310/168 |
| 3,890,517 | 6/1975 | Marsh et al. | 310/168 |
| 4,017,756 | 4/1977 | Davidsonn | 310/168 |
| 4,090,099 | 5/1978 | Daffron | 310/168 |
| 4,161,120 | 7/1979 | Cloarec | 324/173 X |
| 4,572,005 | 2/1986 | Kita | 324/209 X |
| 4,875,785 | 10/1989 | Santos et al. | 384/448 |

Primary Examiner—Gerard R. Strecker
Attorney, Agent, or Firm—Michael H. Minns

[57] ABSTRACT

A magnetic field source is mounted on one race of a two-race radial or thrust bearing. The race with the magnetic field source rotates. The other race does not rotate. A magnetic field sensor is mounted on a flexible arm of a rigid arm support. The arm support with its flexible arm does not rotate but the flexible arm may flex in response to movement of either of the races or the flexible arm support member so that the magnetic field sensor is always kept a constant predetermined distance from the magnetic field source. The number of times alternate magnetic poles on the rotating race is sensed by the sensor per unit of time indicates the speed of the rotating race.

14 Claims, 5 Drawing Sheets

MAGNETIC FIELD SENSOR MOUNTING WITH SENSOR ARM CONTACTING ROTATING BEARING MEMBER

BACKGROUND OF THE INVENTION

This invention relates to bearings. More particularly, this invention is a new radial bearing, or thrust bearing using a magnetic field source and a magnetic field sensor for determining the speed of a rotating race with respect to an opposed fixed race.

Current electronic speed sensors consist of two or more independent components whose sole purpose is to sense speed. Typically, a magnetic field source is pressed onto a specially prepared shaft and sensor is positioned with respect to the magnetic field source. Examples of both thrust bearings and radial bearings having a magnetic field source and a sensor for the magnetic field source are described in U.S. Pat. No. 4,875,785 granted Oct. 24, 1989 in the name of Santos, et al and entitled "Thrust Bearing With A Magnetic Field Detector". Examples of thrust bearings utilizing a magnetic field source and a sensor are described in U.S. Pat. No. 4,915,512, granted Apr. 13, 1990, entitled "Thrust Bearing with a Magnetic Sensor" filed March 24, 1989 in the name of James A. Hilby and Alfred J. Santos.

It is extremely important that the spacing or clearance between the magnetic field source and the sensor be kept constant. Therefore, it is always necessary to manufacture and assemble the various mechanical elements of the bearing under extremely high precise conditions. These requirements result in higher manufacturing cost and lower productivity.

A U.S. Pat. No. 4,572,005 dated Feb. 25, 1986 in the name of Toru Kita and entitled "Magnetostriction Torque Sensor" determines the torque of a steering shaft by sensing the alterations caused by the torque on the shaft of a magnetic field in the steering shaft. An elastic sensor holder, keeps the clearance between the steering shaft and the sensor constant. U.S. Pat. No. 4,572,005, however, does not show or suggest how the separation between the magnetic field source and the magnetic field detector used with radial or thrust bearings can be kept constant.

BRIEF DESCRIPTION OF THE DRAWING FIGURES

This invention provides a solution to the constant air gap separation problem which is present in prior art magnetic sensor radial and thrust bearings. A magnetic field sensor, such as a Hall sensor, is mounted on a flexible arm which always contacts the member carrying the magnetic field source regardless of any axial separation of the parts in a thrust bearing or lack of preciseness in roundness, concentricity, radial dimensions and so forth of a radial bearing.

Briefly described, the invention comprises a rotatable annular member having an annular magnetized portion as a magnetic field source. An arm supporting member has a flexible arm extending from the arm supporting member into contact with the rotatable annular member. A magnetic field sensor is mounted on the flexible arm and positioned to sense the magnetic field from the magnetic field source.

The invention, as well as its many advantages, may be further understood by reference to the following detailed description and drawings in which:

DETAILED DESCRIPTION

In the various figures, like parts are referred to by like numbers.

Figure 2:
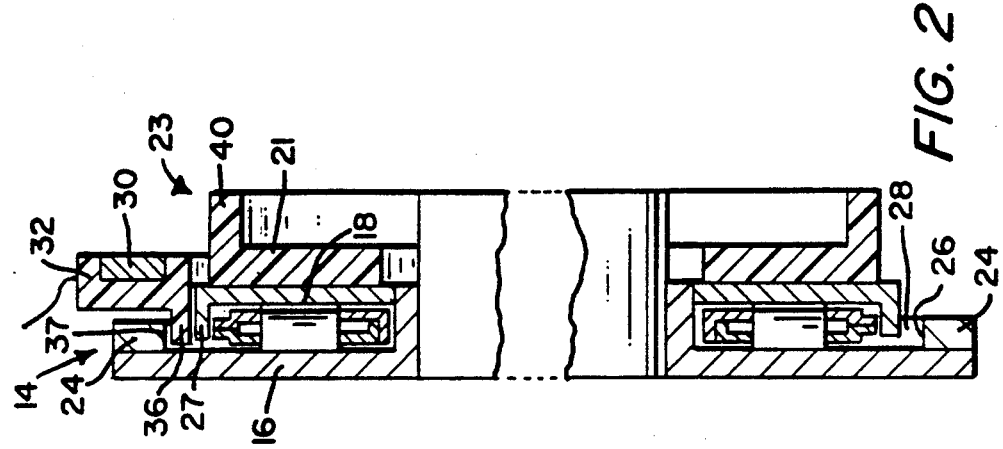
FIG. 2 is a sectional view, on an enlarged scale, of the thrust bearing shown in FIG. 1.
Figure 1:
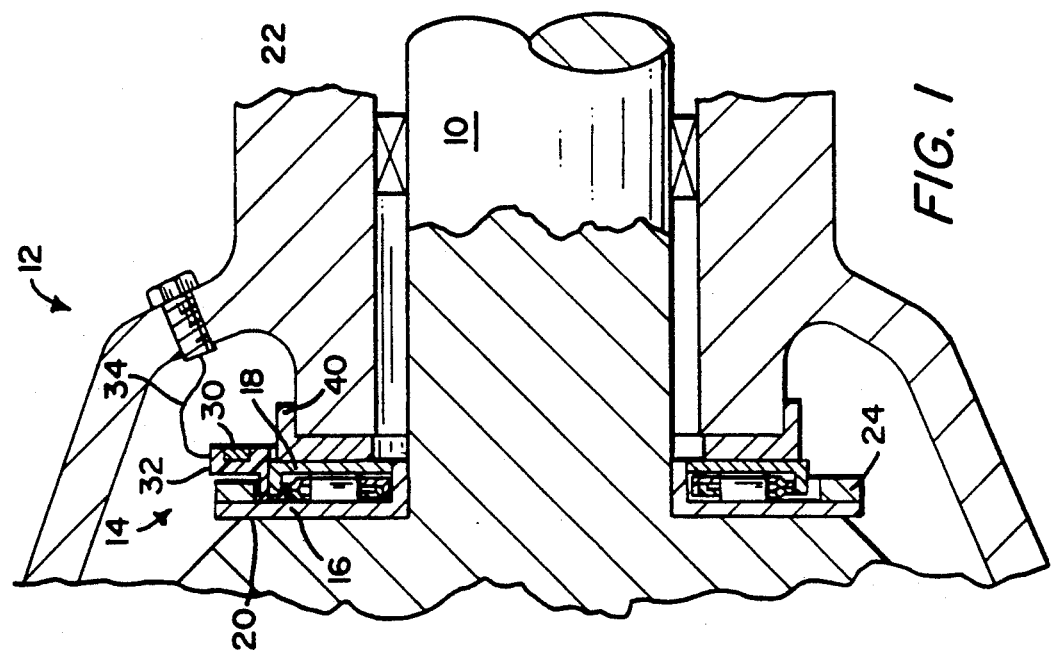
FIG. 1 is a fragmentary view of an automobile transmission output with the new thrust bearing installed in the transmission.

Referring to the drawings, and more par to FIG. 1 and FIG. 2, a rotatable shaft 10 is located within the stationary housing 12. A thrust bearing 14 having a first thrust race 16 and a second thrust race 18 is mounted in the housing with the back side of the thrust race 16 contacting a shoulder 20 of the rotatable shaft 10 and the back side of the thrust race 18 contacting the radially extending annular portion 21 of an annular support 23. Thrust race 16 rotates at the same speed as the shaft 10. The thrust race 18 does not rotate because of the axial force exerted against it by the annular support 23 which is fixed on the back plate 22.

An annular magnetic field source 24 is mounted on the surface of thrust race 16 and faces flexible arm 32. Referring to FIG. 2, the inside periphery 26 of the annular magnetic field source 24 is radially spaced from the outside periphery of the axially extending flange 27 of thrust race 18, thus providing a space 28. A sensor 30 located in a flexible arm 32 senses the number of times the alternate North and South magnetic poles of the magnetic field source 24 pass by the sensor, thus indicating the speed at which the shaft 10 is rotating. The electric signals from the sensor are conducted through line 34 (see FIG. 1).

Figure 4:
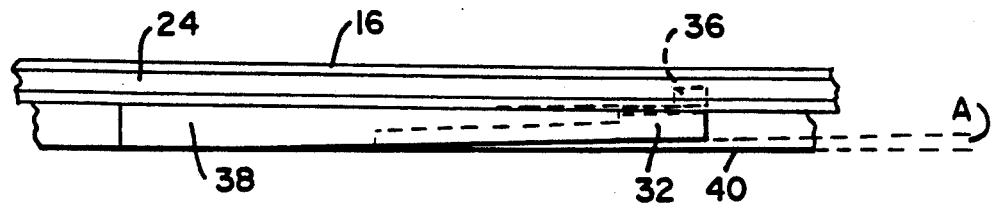
FIG. 4 is a fragmentary top view on an enlarged scale of the embodiment of FIG. 2 and FIG. 3.
Figure 3:
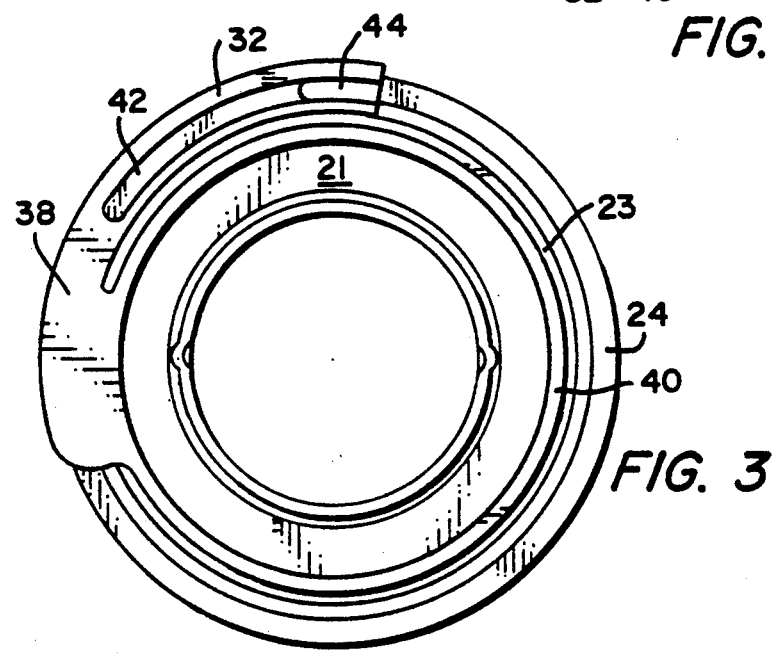
FIG. 3 is a front elevational view of the embodiment of FIG. 2.

Referring to FIG. 3 and FIG. 4, the annular support 23 has the flexible arm 32 extending from the annular support 23 into contact with the rotatable thrust plate 16. The contact is made by means of an axially extending lip 36 (see FIG. 2 and FIG. 4) which is located adjacent the sensor 30 and extends through the space 28 between the inside periphery 37 of annular member 24 and the flange 27 of thrust plate 18 into contact with the thrust plate 16.

The arcuately shaped flexible arm extends integrally from the rigid projection 38 (see FIG. 3). Projection 38 extends outwardly from the outside periphery of supporting member 23. The flexible arm 32 is arcuate shaped and is substantially coaxial with the arm supporting member 23 and extends from the projection 38 at an acute angle "A" with respect to a transverse plane through the flange 40 of the annular support 23 (see FIG. 4).

The length of the flexible arm 32 must be sufficiently long to provide the proper flexibility to keep the arm in contact with the thrust race 16 when the mechanical elements such as the thrust race 18 tend to separate axially a small amount from the thrust race 16.

As shown in FIG. 3, an arcuate groove 42 and a contiguous deeper groove 44 are provided in the flexible arm 32. The sensor 30 (not shown in FIG. 3) is mounted in the deeper groove 44 and wire connections to the sensor are embedded in the groove 42. The wires and sensor may be embedded in the grooves by means of an epoxy, resin, or other suitable means.

In the operation of the thrust bearing of FIG. 1 through FIG. 4, as the shaft 10 rotates the magnetized magnetic annular ring 24 rotates past the stationary, or fixed, sensor 30. The sensor senses the rate at which the North/South magnetic poles on the annular member 24 pass by. The rate indicates the speed of the shaft. The spacing, or separation, of the sensor 30 from the annular magnetic member 24 is kept constant by the flexibility of the flexible arm 32 regardless of any axial movement of the rigid members of the thrust bearing.

Figure 5:
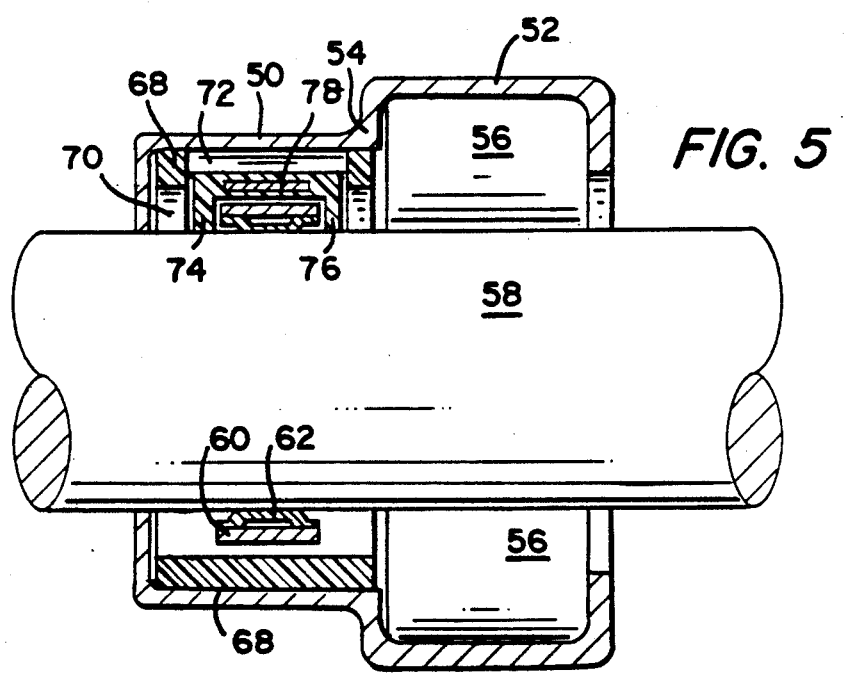
FIG. 5 is a side elevational view partly in section of a preferred embodiment of a radial bearing.
Figure 8:
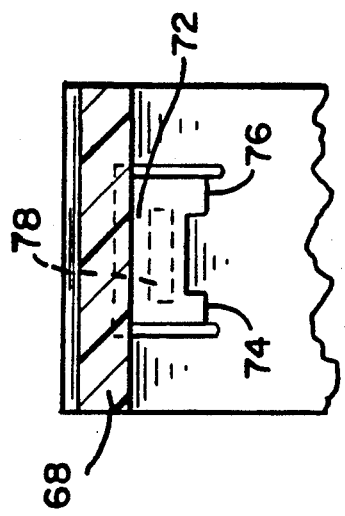
FIG. 8 is a sectional view taken along lines 8—8 of FIG. 6.
Figure 6:
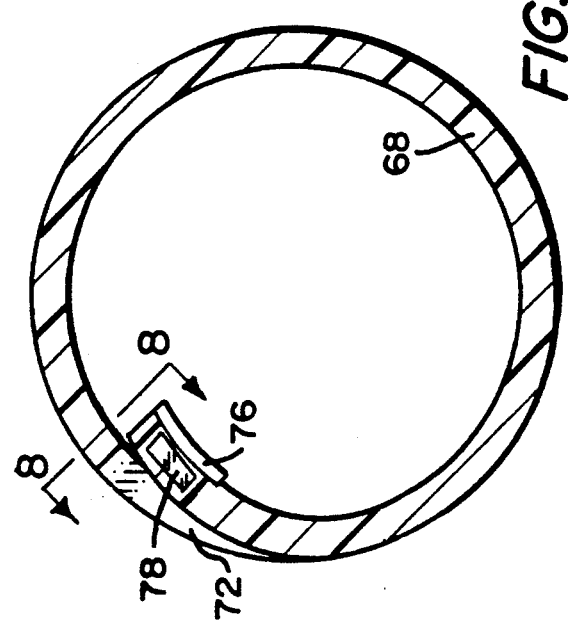
FIG. 6 is a front view in section of the flexible arm supporting member of FIG. 5.
Figure 7:
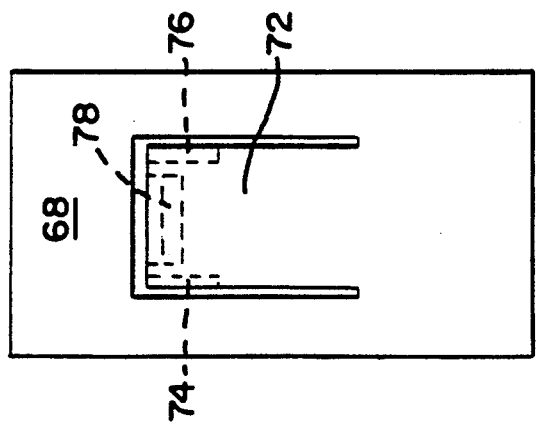
FIG. 7 is a top view of the flexible arm and supporting member of FIG. 6.

FIG. 5 through FIG. 8 show a radial bearing embodiment of the invention. Referring to FIG. 5, the radial bearing has an annular axially extending portion 50 of a predetermined diameter and a larger diameter annular axially extending portion 52 separated from the portion 50 by a radial shoulder 54. The portion 52 serves as a raceway for the rollers 56. The rotatable shaft 58 serves as the other raceway for the rollers 56.

An annular magnet 60 is mounted on an annular magnet support 62 which in turn is coaxially mounted on the rotatable shaft 58. The magnet support 62 is fixed to the shaft 58 by an interference fit in order to axially and radially fix the annular magnet support 62 on the shaft.

A support member 68 is coaxially mounted about the magnet ring support 62 and is radially spaced from the magnet ring support 62 to provide an annulus 70. The support member 68 has a flexible arm 72 extending from the support member 68 obliquely across the annulus 70. The flexible arm 72 has radially extending axially separated legs 74 and 76 which straddle the ring magnet 60. The bottom of the legs 74 and 76 always contact the shaft 58. The length of the legs is such that the sensor 78 is spaced from the magnet 60 and, therefore, does not come into direct contact with the magnet.

In the operation of the radial bearing shown in FIG. 5 through FIG. 8, as the shaft 58 rotates, the magnet 60 rotates with the shaft. As the multiple North/South poles of the magnet pass by the magnetic field sensor 78, the speed is sensed by the sensor 78. Regardless of any lack of precise machining of the shaft or the other mechanical parts of the bearing, the flexible arm maintains the feet 74 and 76 in contact with the shaft 58 so that the sensor 78 is a constant distance from the magnet 60.

Figure 9:
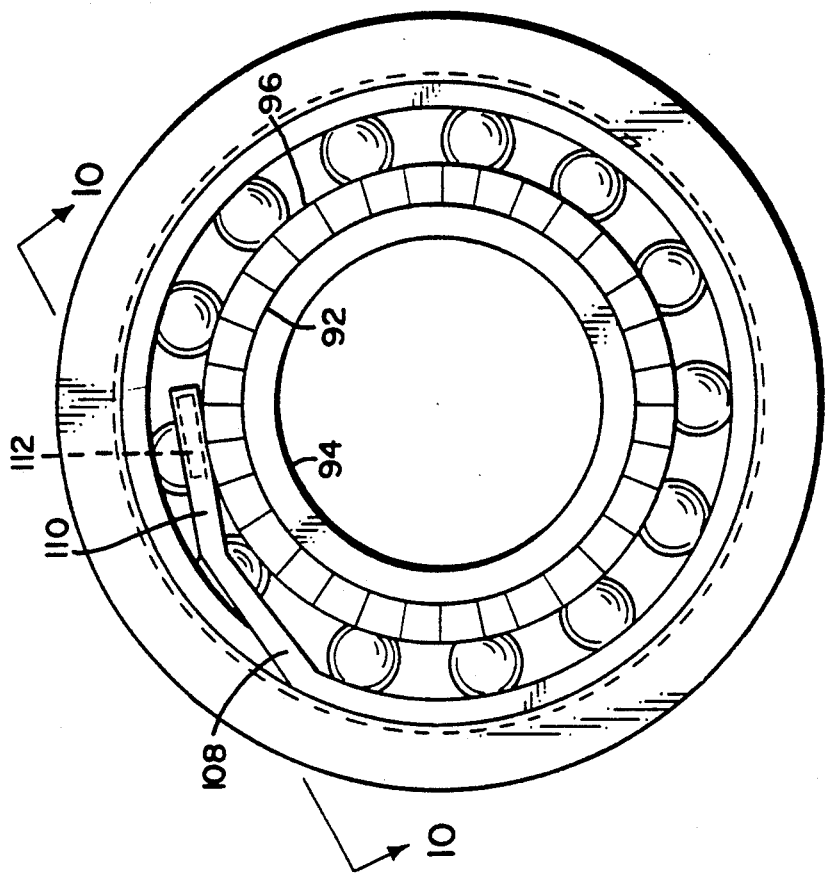
FIG. 9 is a front view partly in section of another preferred embodiment of the invention.
Figure 10:
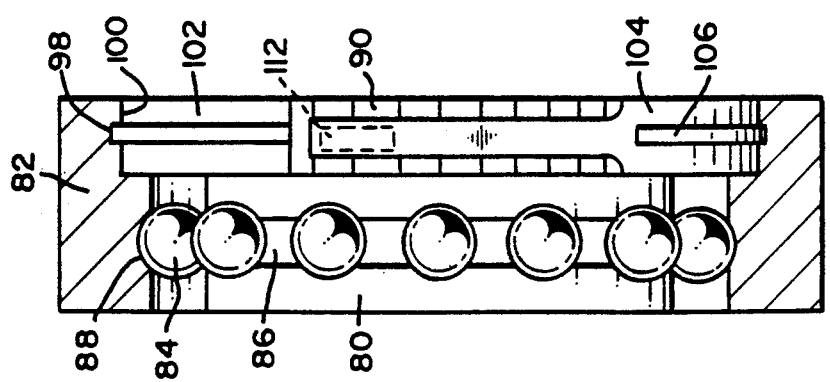
FIG. 10 is a view taken along lines 10—10 of FIG. 9.

FIG. 9 and FIG. 10 show another embodiment of a radial bearing. The radial bearing includes a rotatable inner race 80 and a fixed outer race 82. A plurality of balls 84 ride in the annulus between the two races along groove raceways 86 and 88 in races 80 and 82, respectively.

The rotating ring 80 has an annular magnetized portion 90. The magnetized portion 90 has a larger inside diameter 92 than the inside diameter 94 of the inner race 80 but the outside diameter 96 of the magnetized portion 90 is the same as the outside diameter of the inner ring 80.

Referring to FIG. 10, an annular groove 98 is formed in the surface 100 forming the counter bore 102 of the outer ring 82. The annular arm supporting member 104 is provided with an annular protrusion 106 on its outer perimeter. The protrusion 106 fits tightly within the groove 98 of outer race 82 to keep the support member 104 in the proper axial and radial position in the outer ring 82.

The flexible arm integral with the arm support 104 extends obliquely across the annulus between the magnetic ring 90 and the outer ring 82 and into contact with the annular magnet 90. The flexible arm has a portion 108 proximate to the arm supporting member. The proximate portion 108 extends from the arm supporting member at an acute angle with respect to the arm supporting member. The flexible arm also has a portion 110 distal from the arm supporting member and extending directly from the proximate portion 108. The distal portion 110 distal from the arm supporting member and extending directly from the proximate portion 108. The distal portion 110 extends from the proximate portion 108 at an acute angle with respect to the proximate portion. The sensor 112 is mounted in the distal portion 110 of the flexible arm.

In the operation of the embodiment of FIG. 9 and FIG. 10, as the inner ring 80 rotates, the magnetic ring 90 rotates at the same speed. The sensor 112 in the flexible arm detects and senses the number of magnet North/South poles which pass by the sensor in a unit of time. The flexible arm keeps in contact with the magnetic ring 90 at all times regardless of out of roundness or other lack of precise dimensions in the bearing so that the spacing between the sensor 112 and the magnetic ring 90 is always maintained constant.

Figure 11:
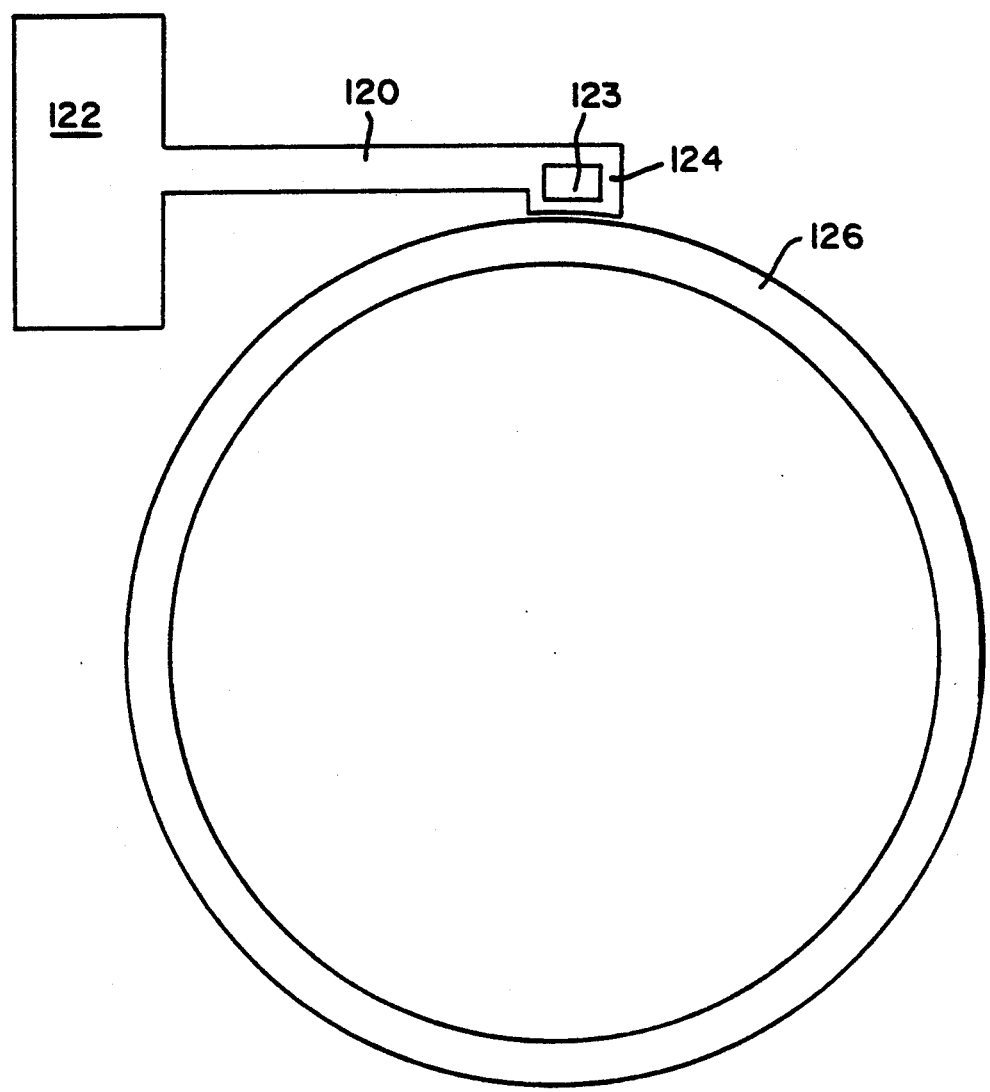
FIG. 11 is a schematic representation of another preferred embodiment of the invention.

It is contemplated that this invention has uses other than with a thrust bearing and a radial bearing. For example, the flexible arm and its sensor could be bolted to a housing such as the housing of a transmission differential or an axle with the flexible arm extending from the housing and contacting a rotating magnet. These possibilities are illustrated by the schematic drawing of FIG. 11. Referring to FIG. 11, the flexible arm 120 extends from the housing 122. The sensor 123 is mounted in a sensor module 124 which is kept continuously in contact with the rotating magnet ring 126 to indicate the speed of rotation of the magnet ring.

We claim:

1. In combination:
    an annular member having an annular magnetized portion as a magnetic field source;
    an arm supporting member having a flexible arm extending from the arm supporting member into contact with the annular member, the annular member being rotatable relative to the arm supporting member; and
    a magnetic field sensor mounted on the flexible arm and positioned to sense the magnetic field from the magnetic field source.

2. The combination of claim 1 wherein: the arm supporting 2 member is annular.

3. The combination of claim 2 wherein the annular member is a bearing thrust plate and the arm supporting member is axially spaced from the bearing thrust plate.

4. The combination of claim 2 wherein the arm supporting member is radially spaced from the annular member.

5. The combination of claim 3 wherein: the arm supporting member has a rigid projection extending outwardly from the outside periphery, the flexible arm is connected to the projection, is arcuate shaped, substantially coaxial with the arm supporting member and extending from the projection at an acute angle with respect to a transverse plane through the arm supporting member.

6. The combination of claim 4 wherein the arm supporting member has a larger inside diameter than the outside diameter of the annular member thus providing an arm supporting member - annular member annulus; and the flexible arm extends obliquely across said annulus.

7. The combination of claim 6 wherein: the flexible arm has a portion proximate to the arm supporting member which extends from the arm supporting member at an acute angle with respect to the arm supporting member and a portion distal from the arm supporting member which extends from the proximate portion at an acute angle with respect to the proximate portion.

8. In combination:
an annular member having an annular magnetized portion as a magnetic field source;
an arm supporting member, the annular member being rotatable relative to the arm supporting member;
a sensor arm extending from the arm supporting member into contact with the annular member;
a biasing means for maintaining the sensor arm in contact with the annular member; and
a magnetic field sensor mounted on the sensor arm and positioned to sense the magnetic field from the magnetic field source.

9. The combination of claim 8 wherein the arm supporting member is annular.

10. The combination of claim 9 wherein the annular member is a bearing thrust plate and the arm supporting member is axially spaced from the bearing thrust plate.

11. The combination of claim 9 wherein the arm supporting member is radially spaced from the annular member.

12. The combination of claim 10 wherein the arm supporting member has a rigid projection extending outwardly from the outside periphery; and
the sensor arms connected to the projection, is arcuate shaped, substantially coaxial with the arm supporting member and extending from the projection at an acute angle with respect to a transverse plane through the arm supporting member.

13. The combination of claim 11 wherein the arm supporting member has a larger inside diameter than the outside diameter of the annular member thus providing an arm supporting member —annular member annulus; and the sensor arm extends obliquely across said annulus.

14. The combination of claim 13 wherein the sensor arm has a portion proximate to the arm supporting member which extends from the arm supporting member at an acute angle with respect to the arm supporting member and a portion distal from the arm supporting member which extends from the proximate portion at an acute angle with respect to the proximate portion.

* * * * *